United States Patent
Ishii

(10) Patent No.: US 8,149,913 B2
(45) Date of Patent: Apr. 3, 2012

(54) MOVING PICTURE CONVERTING APPARATUS AND METHOD, AND COMPUTER PROGRAM

(75) Inventor: Takahiro Ishii, Tokyo (JP)

(73) Assignee: Sony Corporation, Tokyo (JP)

( * ) Notice: Subject to any disclaimer, the term of this patent is extended or adjusted under 35 U.S.C. 154(b) by 1454 days.

(21) Appl. No.: 11/434,876

(22) Filed: May 17, 2006

(65) Prior Publication Data

US 2006/0280250 A1     Dec. 14, 2006

(30) Foreign Application Priority Data

Jun. 10, 2005 (JP) ............... P2005-171626

(51) Int. Cl.
*H04N 7/12* (2006.01)
*H04N 11/04* (2006.01)

(52) U.S. Cl. .................. 375/240.16; 382/232

(58) Field of Classification Search ............. 375/240.16, 375/240.24, 240.12, 240.07; 382/232
See application file for complete search history.

(56) References Cited

U.S. PATENT DOCUMENTS

| | | | | |
|---|---|---|---|---|
| 6,463,178 B1 * | 10/2002 | Kondo et al. | .......... | 382/232 |
| 6,470,050 B1 * | 10/2002 | Ohtani et al. | .......... | 375/240.16 |
| 2004/0247032 A1 * | 12/2004 | Aihara et al. | .......... | 375/240.16 |

FOREIGN PATENT DOCUMENTS

| | | |
|---|---|---|
| JP | 01-231583 A | 9/1989 |
| JP | 07-222145 A | 8/1995 |
| JP | 09-037243 A | 2/1997 |
| JP | 2002-027466 | 1/2002 |
| JP | 2003-169284 | 6/2003 |
| JP | 2004-023670 A | 1/2004 |

OTHER PUBLICATIONS

Japanese Office Action issued Jun. 22, 2010 for corresponding Japanese Application No. 2005-171626.

* cited by examiner

*Primary Examiner* — David Czekaj
*Assistant Examiner* — Anner Holder
(74) *Attorney, Agent, or Firm* — Rader, Fishman & Grauer PLLC

(57) ABSTRACT

A restored image is reconstructed from a thinned image to which no motion vector is incident. There is provided a moving picture converting apparatus for restoring a string of thinned images resulted from thinning pixels of an original-image string, which includes an input unit to receive the thinned-image string, an initial motion vector detector to detect a string of motion vector images on the basis of the thinned-image string, a reconstructing unit to reconstruct, each time a new motion vector image string is detected, a string of restored images on the basis of the new restored-image string and previous detected-motion vector image strings, a motion vector detector to detect, each time a new string of restored images is reconstructed, a new string of motion vector images based on the new restored-image string and previous detected-motion vector image strings, and a process terminating unit to terminate the reconstructing process by the reconstructing unit and motion vector detecting process by the motion vector detector and output a restored image, which has been restored, of the restored-image string obtained at the time of deciding the process termination.

11 Claims, 14 Drawing Sheets

MOVING PICTURE CONVERTING APPARATUS AND METHOD, AND COMPUTER PROGRAM

CROSS REFERENCES TO RELATED APPLICATIONS

The present invention contains subject matter related to Japanese Patent Application JP 2005-171626 filed in the Japanese Patent Office on Jun. 10, 2005, the entire content of which is incorporated herein by reference.

BACKGROUND OF THE INVENTION

1. Field of the Invention

The present invention relates to a moving picture converting apparatus and method and a computer program. More particularly, it is directed to a moving picture converting apparatus and method and a computer program, capable of reconstructing an image from image data compressed by thinning.

2. Description of the Related Art

Moving-picture data is converted to reduce its size, namely, it is compressed, for storage in a storage medium such as hard disk, DVD or the like or for distribution over a network. Recently, the size of moving-picture data has drastically been increased along with an improvement in the quality of moving picture data. One of such picture data is the high-definition data. In these circumstances, many studies and researches have been made as to the compression of moving picture data, the improvement of the data compression ratio in image reconstruction, and the prevention of deterioration of reconstructed images.

A moving picture can be compressed by, for example, a thinning of pixels of picture frames included in moving picture data, that is, space-directional thinning of the pixels, and a reduction of the frame rate, that is, time-directional thinning of the pixels, etc.

Advantageously, moving picture data can efficiently be stored in a storage medium or transferred via a network owing to a data-amount reduction by such data conversion. When the compressed data is restored and reproduced, however, the image quality will be deteriorated. Especially, in the case where the original data is a high-definition picture, the image deterioration will be more noticeable.

Various studies have been made on how to minimize the image deterioration. For example, the Japanese Patent Laid-Open No. 2003-169284 discloses an image compression in which a parameter is set based on the brightness of an image and the manner of compression is varied depending upon the image brightness. Also, the Japanese Patent Laid-Open No. 2002-27466 discloses an image compression in which a scene is divided into a plurality of blocks and the manner of compression is varied for each of the blocks.

SUMMARY OF THE INVENTION

Note that the aforementioned compressed data includes a thinned image and motion vector. A compressed amount of motion vector data will be calculated here. On the assumption that one vector is assigned to each pixel and 8-bit elements form two dimensions, a vector image string of full HD (full high-definition: 1920×1080=about 2,000,000 pixels each including 24 bits) can be transferred in a time of f×1920× 1080×8×⅔=about 4 f MB/sec. The data compression ratio is in the order of ⅓ to ¼ even if the vector image string is reversibly-compressed by the Huffman coding or any other manner of coding. Thus, the transmission rate of the reversibly compressed vector image string should be 1 f MB/sec. Since ordinary full HD compressed data including an image can be transmitted or recorded at a rate of 0.5 f MB/sec at maximum, the transmission rate of 1 f MB/sec will limit the improvement of the motion vector data compression ratio.

It is therefore desirable to overcome the above-mentioned drawbacks of the related art by providing a moving picture converting apparatus and method and a computer program for reconstructing a restored picture from thinned images to which no motion vector is incident.

According to the present invention, there is provided a moving picture converting apparatus and method and a computer program allowing a computer to carry out the moving picture converting method, in which a string of thinned images resulted from thinning pixels in an original image string is inputted, a motion vector is detected based on the thinned-image string, there are repeated a process in which each time a new motion vector is detected a restored image is reconstructed based on a new string of motion vector images and thinned-image string, and a process in which at reconstruction of a new string of restored images a new motion vector is detected based on the new restored image string and a motion vector detected just before the reconstruction of the new restored image string, and a restored image finally reconstructed after the process repetition is outputted.

According to the present invention, a motion vector as an initial value is detected based on a thinned image, a first restored image is first reconstructed based on the motion vector as the initial value and thinned image, and a new motion vector is detected based on the first restored image and motion vector as the initial value. Next, restored image reconstruction based on the thinned image and new motion vector and new motion-vector detection based on the new restored image and motion vector are repeated, thereby gradually increasing the precision of the motion vector to improve the quality of restored image. According to the present invention, an original image is restored from a thinned image to which no motion vector is incident. Thus, it is possible to reduce the data amount of the motion vector.

BRIEF DESCRIPTION OF THE DRAWINGS

FIG. 5 also explains space-directional operations of the block processor in the moving picture converter;

DETAILED DESCRIPTION OF THE PREFERRED EMBODIMENTS

The present invention will be described in detail concerning the moving picture converting apparatus and method and a computer program as embodiments thereof with reference to the accompanying drawings. It should be noted that the following will be described in sequence:
  (1) Basic construction of the moving picture converter using the super-resolution effect;
  (2) Moving picture converting apparatus and method for generating a restored image on the basis of compressed data to which no motion vector is incident; and
  (1) Basic construction of the moving picture converter using the super-resolution effect First, the moving picture converting apparatus (hereinafter referred to as a "moving picture converter") to compress a moving picture under the super-resolution effect as the base of the present invention. It should be noted that the basic construction is disclosed in detail in the description and drawings of the Japanese Patent Application 2003-412501 that the Applicant of the present invention already has filed in the Japanese Patent Office, in which a picture is divided into blocks and the data amount of the picture is reduced by thinning pixels and a frame rate adaptively to a moving velocity of each of the blocks.

Figure 1:
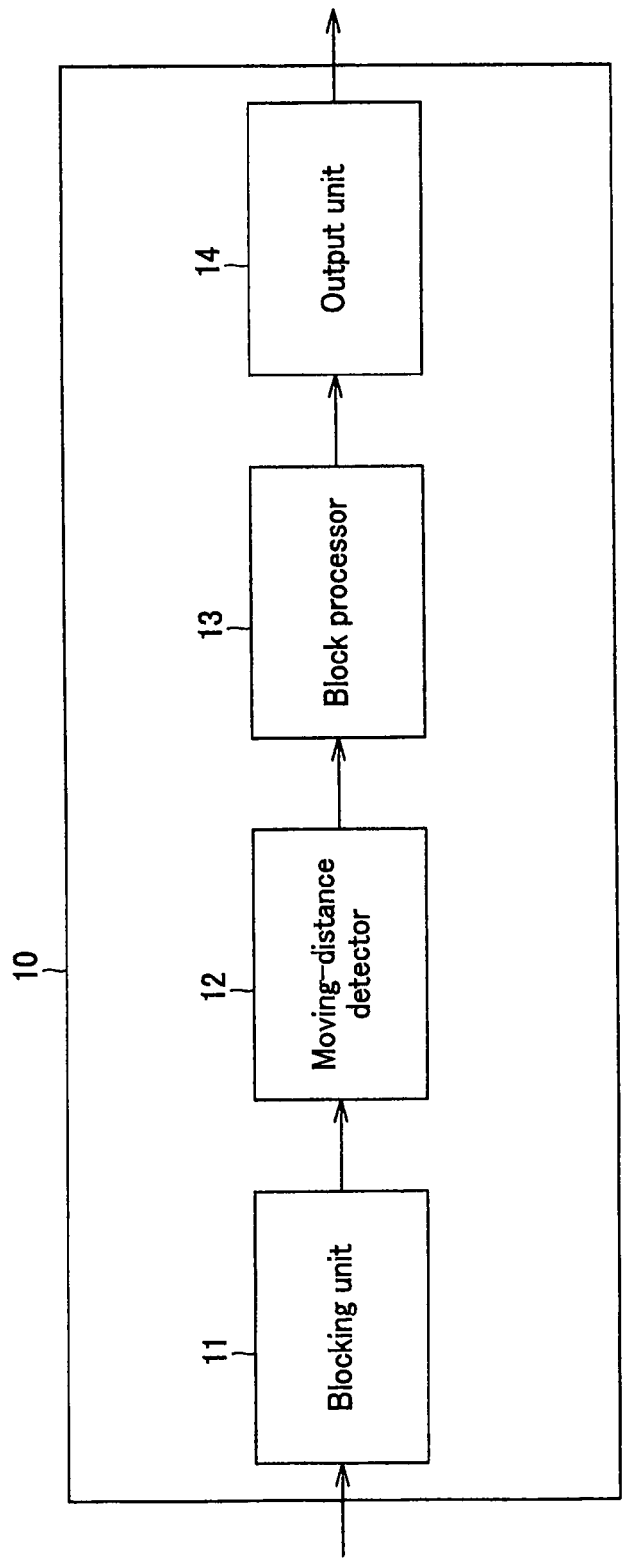
FIG. 1 is a schematic block diagram of the basic construction of a conventional moving picture converter for making data conversion under the super-resolution effect.

FIG. 1 illustrates an example of the construction of a conventional moving picture converter disclosed in the description and drawings of the Japanese Patent Application N. 2003-412501. The moving picture converter, generally indicated with a reference numeral 10, is designed to reduce the data amount of a moving picture to such an extent that the viewer cannot perceive any deterioration due to the reduction of a data amount by making a moving picture conversion under the super-resolution effect.

Note that the "super-resolution effect" is a visual effect under which the viewer can perceive a higher resolution than the number of displayed pixels when he or she looks after a moving object discretely sampled in the spatial direction. This is because the human being has a visual characteristic in which he will perceive an image having added thereto a plurality of images presented in a certain length of time. This characteristic is ascribable to the time integration function included in the optical sensation, well known as "Bloch's law", as stated in "Visual Information Handbook", Japan Institute of Visual Sense, lines 219-220 and the like. It has been reported that the integrated length of time for which the Bloch's law is realized is about 25 to 100 ms, depending upon the presenting conditions such as intensity of background light and the like.

The moving picture converter 10 shown in FIG. 1 makes moving picture conversion under the super-resolution effect raised by the time integration function to reduce or compress data to such an extent that the viewer will not perceive any image deterioration due to the data compression. The construction of the moving picture converter 10 will be explained below with reference to FIG. 1.

The moving picture converter 10 includes a blocking unit 11, a moving-distance detector 12, a block processor 13 and an output unit 14. The blocking unit 11 divides each of the frames of an input moving picture into blocks, each including a predetermined pixel, and supplies the blocks to the moving-distance detector 12. The moving-distance detector 12 detects a moving distance of each of the blocks supplied from the blocking unit 11, and sends the block and its moving distance to the block processor 13. The block processor 13 makes a moving-picture conversion, that is, compression, of the block supplied from the moving-distance detector 12 correspondingly to the moving distance of the block to reduce the data amount. The block processor 13 supplies the output unit 14 with the data of the compressed block supplied from the compression and having the data amount reduced. The output unit 14 outputs all the data of the block supplied from the block processor 13 and having the amount reduced together as a stream data.

Next, each of the above units will be explained in detail with reference to FIG. 2. First, the blocking unit 11 will be explained. As shown, it includes an image storage unit 21 and blocking unit 22. The image storage section 21 is supplied with frames of a moving picture supplied to the moving picture converter 10. The image storage section 21 stores the supplied frames. Each time the frames have been stored count N (positive integer), the image storage section 21 supplies the N frames to the blocking section 22, and the M-th one of the N frames (hereinafter referred to as "M-th frame") to the moving-distance detector 12 (moving-distance detecting section 31). It is assumed herein that the number N is four (N=4).

The blocking section 22 divides each of the N successive frames supplied from the image storage section 21 into blocks each having a certain size (8×8 or 16×16, for example) and supplies the blocks to the moving-distance detecting section 12 (block distributing section 32). Also, the blocking section 22 supplies each of blocks of the P-th one of the N frames stored in the image storage section 21 (herein after referred to as "P-th frame") to the moving-distance detector 12 (moving-distance detecting section 31). The P-th frame is different from the M-th frame.

Next, the moving-distance detector 12 will be explained. As shown, it includes a moving-distance detecting section 31 and block distributing section 32. The moving-distance detecting section 31 of the moving-distance detector 12 detects the motion vector of each block of the P-th frame supplied from the blocking section 22 of the blocking unit 11 by making block matching, for example, between the blocks with reference to the M-th frame supplied from the image storage section 21, and it supplies the detected motion vector to the block distributing section 32. The motion vector represents moving distances in the horizontal (X-axial) and vertical (Y-axial) directions between the frames. It should be noted that the moving-distance detecting section 31 may be designed to enlarge the image for an improved accuracy of the moving-distance detection, to thereby make the moving-distance detection with the enlarged image.

The block distributing section 32 of the moving-distance detector 12 is supplied with N blocks (a total of N blocks taking corresponding positions in N frames) from the blocking section 22, and a moving distance of one of the N blocks in the P-th frame from the moving-distance detecting section 31. The block distributing section 32 supplies the supplied N blocks and moving distances to any one of block processing sections 51 to 53 included in the block processor 13 to make operations corresponding to the moving distances, respectively.

More particularly, in the case where the horizontal (X-axial) or vertical (Y-axial) moving distance in one frame, supplied from the moving-distance detecting section 31, is more than two pixels, the block distributing section 32 outputs the N blocks supplied from the blocking sections 22 and moving distance supplied from the moving-distance detecting section 31 to the block processing section 51. Also, in the case where the horizontal or vertical moving distance in one frame is less than two pixels and more than one pixel, the block distributing section 32 outputs the N blocks and moving distance to the block processing section 53. In the case where the moving distance is other than the above, the block distributing section 32 will supply the N blocks and moving distance to the block processing section 52.

That is, the block distributing section 32 determines an optimum frame rate and spatial resolution on the basis of the moving distance supplied from the moving-distance detecting section 21, and distributes block images to the block processing sections 51, 52 and 53 that will convert the image data according to the frame rate and spatial resolution.

Next, the block processor 13 will be explained in detail. The block processor 13 includes the three block processing sections 51 and 53 as mentioned above. The block processing section 51 space-directional thinning of pixels in the total of N blocks (whose horizontal or vertical moving distance is more than two pixels) supplied from the block distributing section 32 of the moving-distance detector 12 and taking corresponding positions in the N (N=4, for example) successive frames correspondingly to the moving distance also supplied from the block distributing section 32.

Figures 3A, 3B, 3C:
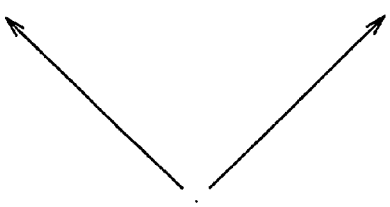
FIG. 3 explains space-directional thinning operations of a block processor in the moving picture converter.

More specifically, in the case where the horizontal moving distance in one frame is more than two pixels, the block processing section 51 will select only one of the horizontal four pixels and validate it as a representative value when a block to be processed includes 4×4 pixels as shown in FIG. 3A. In an example shown in FIG. 3B, only P10 of four pixels P00 to P30 is validated as a representative value (sampling point). The other pixel values are invalidated. Similarly, P11 of four pixels P01 to P31 is validated as a representative value (sampling point), P12 of four pixels P02 to P32 is validated as a representative value (sampling point), and P13 of four pixels P03 to P33 is validated as a representative value (sampling point).

When the vertical moving distance in one frame is more than two pixels, the block processing section 51 will select one of the vertical four pixels and validate it as a representative value in case a block is 4×4 pixels as shown in FIG. 3A. In an example shown in FIG. 3C, only P01 of four pixels P01 to P03 is validated as a sampling point. The other pixel values are invalidated. Similarly, P11 of four pixels P10 to P13 is validated as a sampling point, P21 of four pixels P20 to P23 is validated as a sampling point, and P31 of four pixels P30 to P33 is validated as a sampling point.

Since the block processing section 51 makes the above space-directional thinning of each of the total of N (N=4) blocks taking corresponding positions in the supplied N (N=4, for example) successive frames, the data amount of each block is reduced to a quarter and thus the data amount of all the four blocks is reduced to a quarter. The block processing section 51 supplies data on the four blocks whose data amount has been reduced to the quarter to the output unit 14.

The block processing section 52 shown in FIG. 2 operates as described below. The block processing section 52 time-directional thinning of the total of N blocks (whose horizontal and vertical moving distances are both less than one pixel) supplied from the block distributing section 32 of the moving-distance detector 12 and taking corresponding positions in the N (N=4, for example) successive frames.

Figure 4:
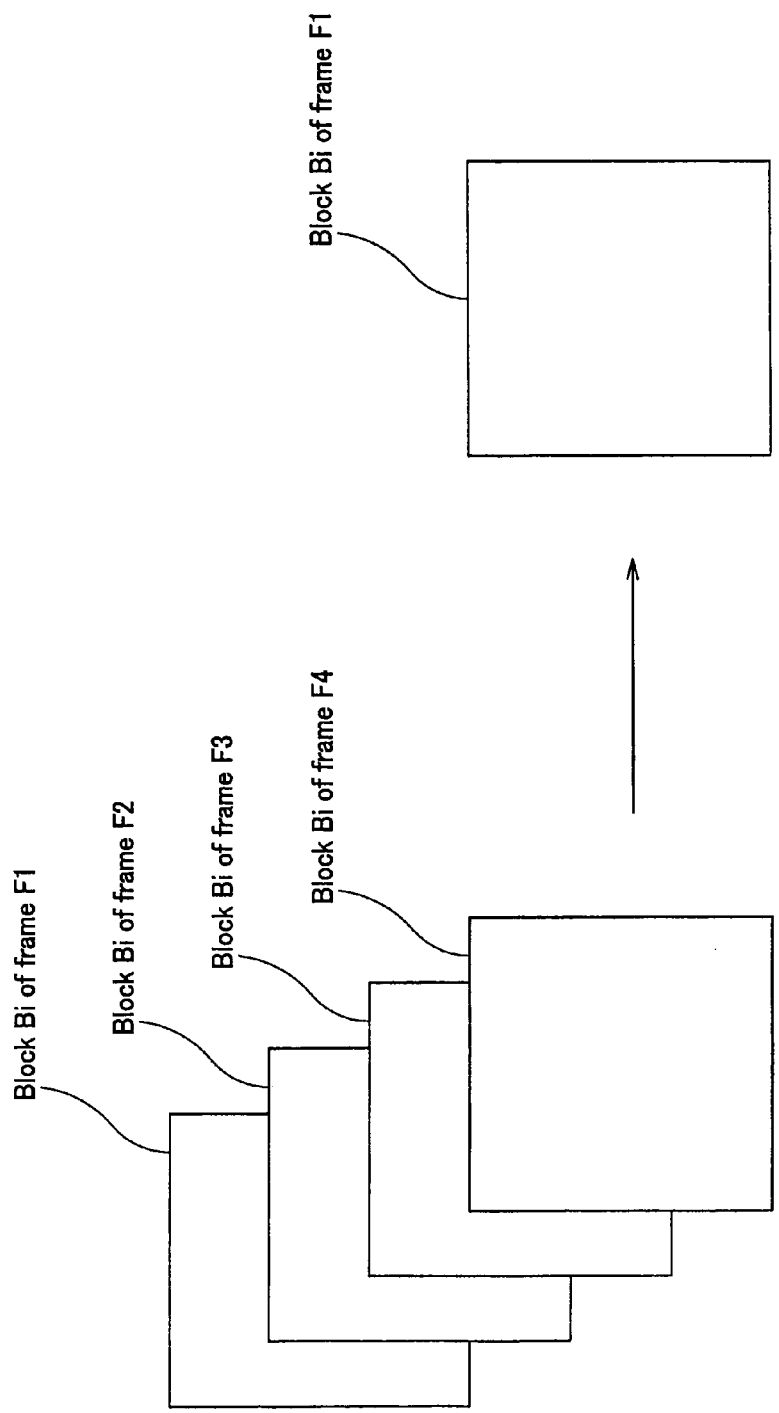
FIG. 4 also explains time-directional thinning operations of the block processor in the moving picture converter.

More specifically, the block processing section 52 frame thinning of four successive frames F1 to F4 to select only one (Bi in the frame F1, in this case) of four blocks Bi taking corresponding positions in the four frames F1 to F4 as shown in FIG. 4. The block processing section 52 supplies data in the four blocks whose data amount has been reduced to a quarter (data in one block), resulting from the time-directional thinning, to the output unit 14. Thus, the pixel data for the selected one block is taken as sampling-point data corresponding to the four frames.

The block processing section 53 makes the pixel thinning (space-directional thinning) and frame thinning (time-directional thinning) of the total of N blocks (N blocks whose horizontal and vertical moving distances are both more than one pixel and less than two pixels) supplied from the block distributing section 32 of the moving-distance detector 12 and taking corresponding positions in the N successive frames.

Figures 5A, 5B, 5C:
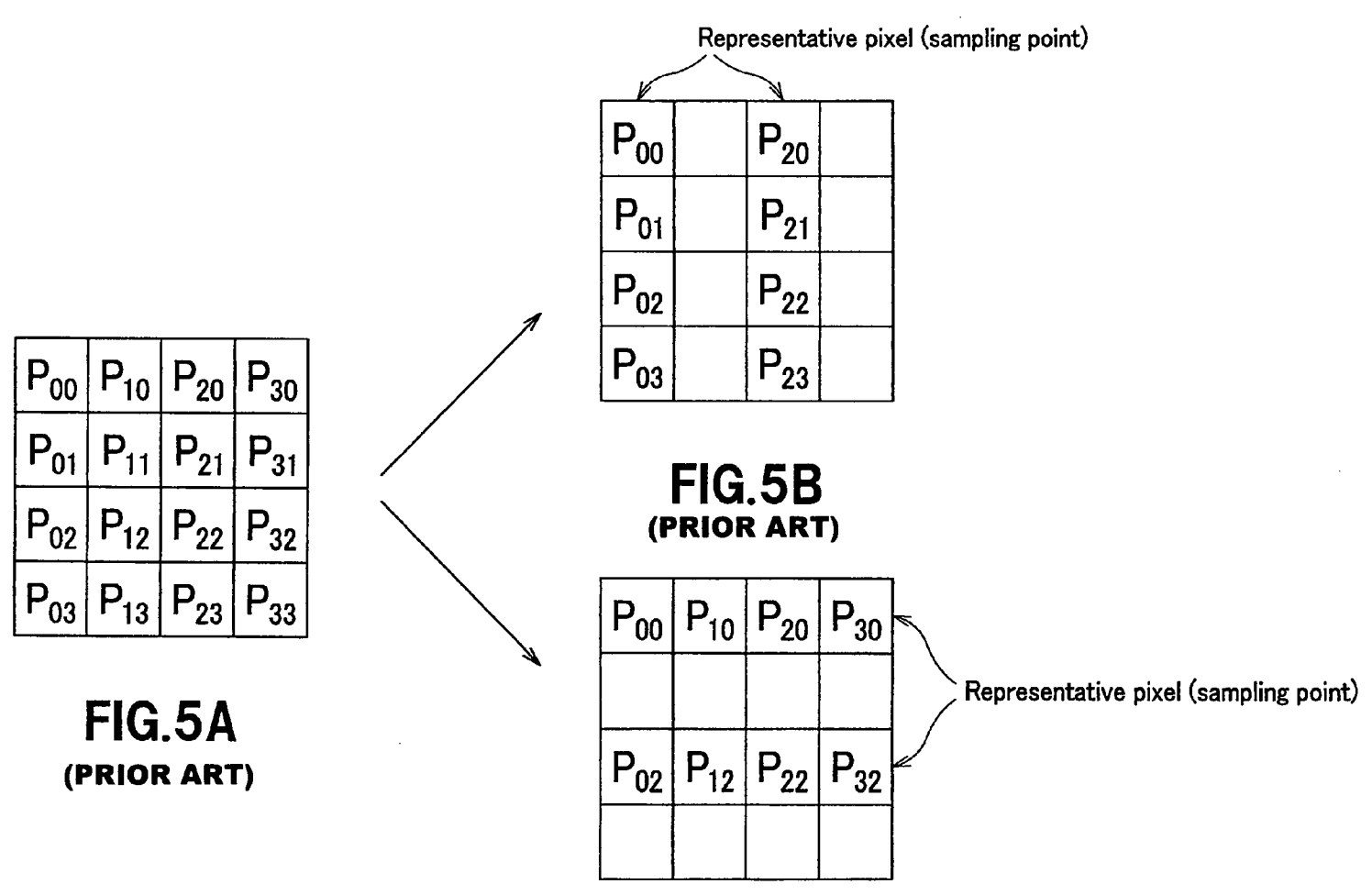

The block processing section 53 makes a different thinning operation from that which the block processing section 51 does. That is, when the horizontal moving distance in one frame is more than one pixel and less than 2 pixels as shown in FIG. 5, the block processing section 53 selects only two of four horizontal pixels and takes them as representative values in the case where a block to be processed is 4×4 pixels as shown in FIG. 5A. In an example shown in FIG. 5B, only P00 and P20 of four pixels P00 to P30 are validated as the representative values (sampling points). The other pixel values are invalidated. Similarly, only P01 and P21 of four pixels P01 to P31 are taken as representative values (sampling points), only P02 and P22 of four pixels P02 to P32 are taken as representative values (sampling points) and only P03 and P23 of four pixels P03 to P33 are taken as representative values (sampling points).

When the vertical moving distance in one frame is more than one pixel and less than two pixels, the block processing section 53 will select two of four vertical pixels as representative values (sampling points) in case the block to be processed is 4×4 pixels as shown in FIG. 5A while discarding the other pixels. In the example shown in FIG. 5C, only pixels P00 and P02 of four pixels P00 to P03 are validated as representative values (sampling points) and the others are invalidated. Similarly, P10 and P12 of four pixels P10 to P13 are taken as representative values (sampling points), only P20 and P22 of four pixels P20 to P23 are taken as representative values (sampling points) and only P30 and P32 of four pixels P30 to P33 are taken as representative values (sampling points).

Figure 6:
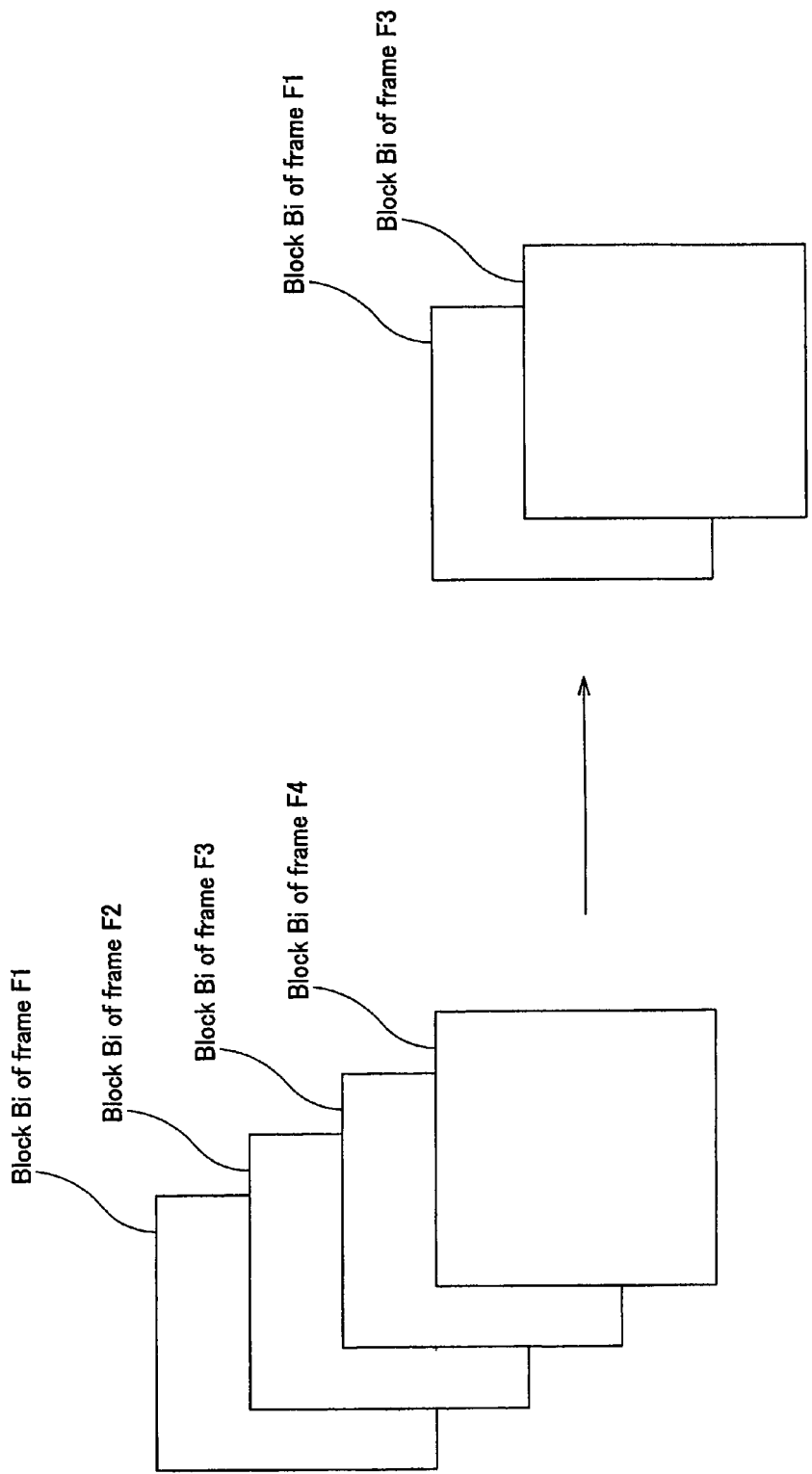
FIG. 6 also explains time-directional operations of the block processor in the moving picture converter.

Further, the block processing section 53 thins frames. More particularly, the block processing section 53 thins frames by selecting two of four blocks in corresponding positions in four successive frames F1 to F4. The frame thinning operation by the block processing section 53 is different from the thinning operation by the block processing section 52. Namely, the block processing section thins frames (between two frames) by selecting any two of a total of four blocks Bi taking corresponding positions in the four successive frames F1 to F4 (two blocks in the frames F1 and F3) as shown in FIG. 6. Pixel data in the selected two blocks are sampling-point data corresponding to the four frames. In this case, the eight sampling points have already been selected in one block in the space-directional thinning that has been described above with reference to FIG. 5. A total of 16 sampling points is selected from two blocks, and they will be set as sampling-point data corresponding to the four frames.

The block processing section 53 subjects the supplied four blocks to both space-directional thinning to reduce the data amount to a half as described above with reference to FIG. 5, and time-directional thinning to reduce the data amount to a half, as described above with reference to FIG. 6. As the result, the data amount of the four blocks is reduced to a quarter (¼=(½×(½)). Thus, the block processing section 53 supplies data in the four blocks whose data amount has been reduced to a quarter to the output unit 14.

The output unit 14 generates stream data from the data on the N blocks supplied from each of the block processing sections 51 to 53 of the block processor 13 and whose data amount has been reduced.

Figure 7:
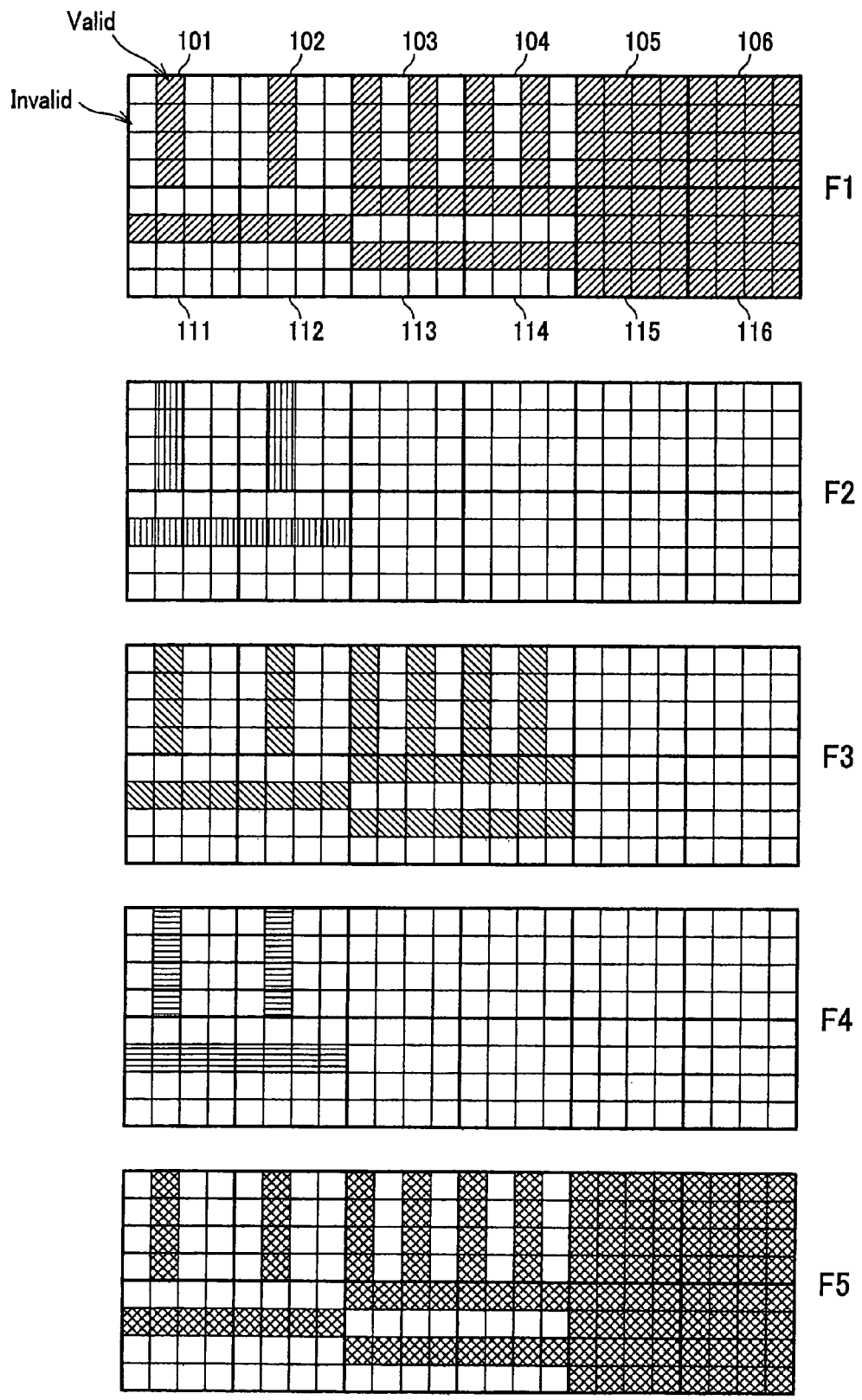
FIG. 7 explains an example of the results of block processing operations made by the block processor in the moving picture converter.

The moving picture converter 10 operates as described below with reference to FIG. 7. FIG. 7 shows five successive frames F1 to F5 processed by the moving picture converter 10 and positions of valid data selected from each frame. In FIG. 7, blocks other than blanks indicate valid pixels selected in the moving picture converter 10 and blank blocks indicate invalid pixels not selected.

The frames F1 and F5 are identical to each other and laid in a time sequence, and each of them includes blocks 101 to 116 each of 4×4 pixels.

The blocks 101 and 102 of the blocks 101 to 116 are thinned by the block processing section 51 horizontally in the spatial direction. The blocks 111 and 112 are thinned by the block processing section 51 vertically in the spatial direction. The blocks 103 and 104 are thinned by the block processing section 53 horizontally in both the spatial and temporal directions. The blocks 113 and 114 are thinned by the block processing section 53 in both the spatial and temporal directions. The blocks 105, 106, 115 and 116 are thinned by the block processing section 52 in the temporal direction.

Of the first frame F1, each of the blocks 101 and 102 is horizontally thinned by the block processing section 51 to a quarter (four valid pixels) of the initial data amount. Each of the blocks 111 and 112 is vertically thinned by the block processing section 51 to a quarter (four valid pixels) of the initial data amount. Each of the blocks 103 and 104 is horizontally thinned by the block processing section 53 to a half (eight valid pixels) of the initial data amount. Each of the blocks 113 and 114 is vertically thinned by the block processing section 53 to a half (eight valid pixels) of the initial data amount. Each of the blocks 105, 106, 115 and 116 is thinned in the temporal direction by the block processing section 52 to a quarter (four valid pixels) of the initial data amount.

Of the second frame F2, each of the blocks 101 and 102 and blocks 111 and 112 is thinned similarly to the frame F1 to a quarter (four valid pixels) of the initial data amount. Each of the blocks 103 and 104 and blocks 113 and 114 is thinned by the block processing section 53 in the temporal direction for all their pixels to be invalid. Each of the blocks 105, 106, 115 and 116 is thinned by the block processing section 52 in the temporal direction for all their pixels to be invalid.

Of the third frame F3, each of the blocks 101 and 102 and blocks 111 and 112 is thinned similarly to the frame F1 to a quarter (four valid pixels) of the initial data amount. Each of the blocks 103 and 104 and blocks 113 and 114 forms a valid frame, and thinned similarly to the frame F1 to a half (eight valid pixels) of the initial data amount. Each of the blocks 105, 106, 115 and 116 is thinned by the block processing section 52 in the temporal direction for all their pixels to be invalid.

Of the fourth frame F4, each of the blocks 101 and 102 and blocks 111 and 112 is thinned similarly to the frame F1 to a quarter (four valid pixels) of the initial data amount. Each of the blocks 103 and 104 and blocks 113 and 114 is thinned by the block processing section 53 in the temporal direction for all their pixels to be invalid. Each of the blocks 105, 106, 115 and 116 is thinned by the block processing section 52 in the temporal direction for all their pixels to be invalid.

Since it is assumed herein that N=4, the fifth frame F5 is thinned similarly to the first frame F1. Thus, data in each of the blocks is optimally thinned correspondingly to moving-velocity information, and is finally reduced to a quarter of the initial data amount.

As has been explained above, the moving picture converter 10 shown in FIG. 1 converts an input moving picture into a moving picture with the data amount thereof reduced (compressed data). At this time, the moving picture conversion is made using the super-resolution effect which can be implemented on the basis of the predetermined visual characteristic, so that the viewer will not be aware of any image deterioration due to the reduction of the data amount.

More specifically, the block distributing section 32 determines an optimum frame rate and spatial resolution on the basis of a moving distance supplied from the moving-distance detecting section 21 and supplies them to the block processing sections 51 to 53, which will convert image data according to the optimum frame rate and spatial resolution, and the block processing sections 51 to 53 convert the image data in different manners, respectively, to thereby implement a moving picture conversion that the viewer will not be aware of any image deterioration. It should be noted that the "super-resolution effect" is a visual effect under which the viewer will perceive a higher resolution than the number of displayed pixels when he or she looks after a moving object discretely sampled in the spatial direction as has previously been mentioned. This is ascribable to the time integration function included in the human being's faculty of sight. The moving picture converter 10 shown in FIG. 1 makes moving picture conversion using the super-resolution effect based on the time integration function.

Note that the human being's visual character and super-resolution effect are described in detail in the description and drawings of the Japanese Patent Application No. 2003-412501. The conditions under which the super-resolution effect explained in the description and drawings of this patent application are achieved will be outlined below.

When pixels are thinned by a data amount (in pixels) m, the super-resolution effect will take place under the condition that all the primary-to (m−1)th-order aliasing components caused by the thinning are canceled. For the k(=1, 2, . . . , m−1)th-order aliasing component to be canceled, the following equations (1) and (2) should be met:

$$\sum_t \cos(2\pi k \Phi_1) = 0 \qquad (1)$$

$$\sum_t \sin(2\pi k \Phi_1) = 0 \qquad (2)$$

where $\phi_1$ is a deviation of the sampling position in thinning the pixels, which is defined by a time t(=0, 1 T, 2 T, . . . ), velocity v of a signal and a time interval T (reciprocal of a frame rate) on the basis of the following equation (3):

$$\Phi_1 = -\frac{v}{m}\frac{t}{T} \qquad (3)$$

The super-resolution effect will take place when the equations (1) to (3) include the amount of thinning (in pixels) m and moving distance v in a small block, and thus an image deterioration will not be easy to perceive by the viewer.

In the case where an image is displayed at the same frame rate as that of an input moving picture, a block thinned in the spatial distance and images in a preceding and following frames are added together by the time integration function of the human being's sense of sight with the result that an image equivalent to an original image can be perceived by the viewer.

The moving picture converter 10 can compress the data amount to a quarter by thinning. For example, the data amount of full HD (full high-definition: 1920×1080=about 2,000,000 pixels each including 24 bits) image is 6 MB per frame. Therefore, when f frames of this image are transferred for a second, the transfer rate is 6 f MB/sec. Thinning the full HD image permits a reduction of the transfer rate to 1.5 f MB/sec which is a quarter of the transfer rate of 6 f MB/sec. Further, use of this data thinning technique and MPEG (Moving Picture Experts Group) 4 that permits a high-efficiency irreversible compression in combination permits a reduction of the transfer rate to about 0.015 f MB/sec which is about 1/100 of the transfer rate of about 1.5 f MB/sec.

In the above series of compression processes, a motion vector is generated. When the motion vector is compressed irreversibly similarly to a thinned image, an artifact such as jaggies, image distortion or the like will take place in a restored image, which is evident from the theory of restoration. Thus, a motion vector can irreversibly be compressed because a high precision is required, but any reversible compression cannot be made with a high ratio.

A compressed amount of motion vector data will be calculated here. On the assumption that one vector is assigned to each pixel and 8 bit elements form two dimensions, an original vector image string can be transferred at a rate of f×1920× 1080×8×2/8 per sec (=about 4 f MB/sec). The data compression ratio is on the order of 1/3 to 1/4 even if the vector image string is reversibly compressed by the Huffman coding or any other manner of coding. Thus, the transmission rate of the reversibly-compressed vector image string should be if MB/sec. Also, when one vector is assigned to an image block including 4×4 pixels, the transfer rate will be 1 f/(4×4)= 0.0625 f MB/sec which is four times or higher than the image data transfer rate of 0.015 f MB/sec. The transfer rate will limit improvement of the motion vector data compression ratio.

(2) Moving picture converting apparatus and method, for generating a restored image on the basis of compressed data to which no motion vector is incident As mentioned above, when a motion vector is incident to compressed image data, its size will limit the improvement of the compression ratio. In a moving picture converter 40 according to the present invention, a restored image is reconstructed while estimating a motion vector from compressed image data including only thinned images and to which no motion vector is incident, whereby a reduction of the compression ratio due to the motion vector is avoidable.

Figure 8:
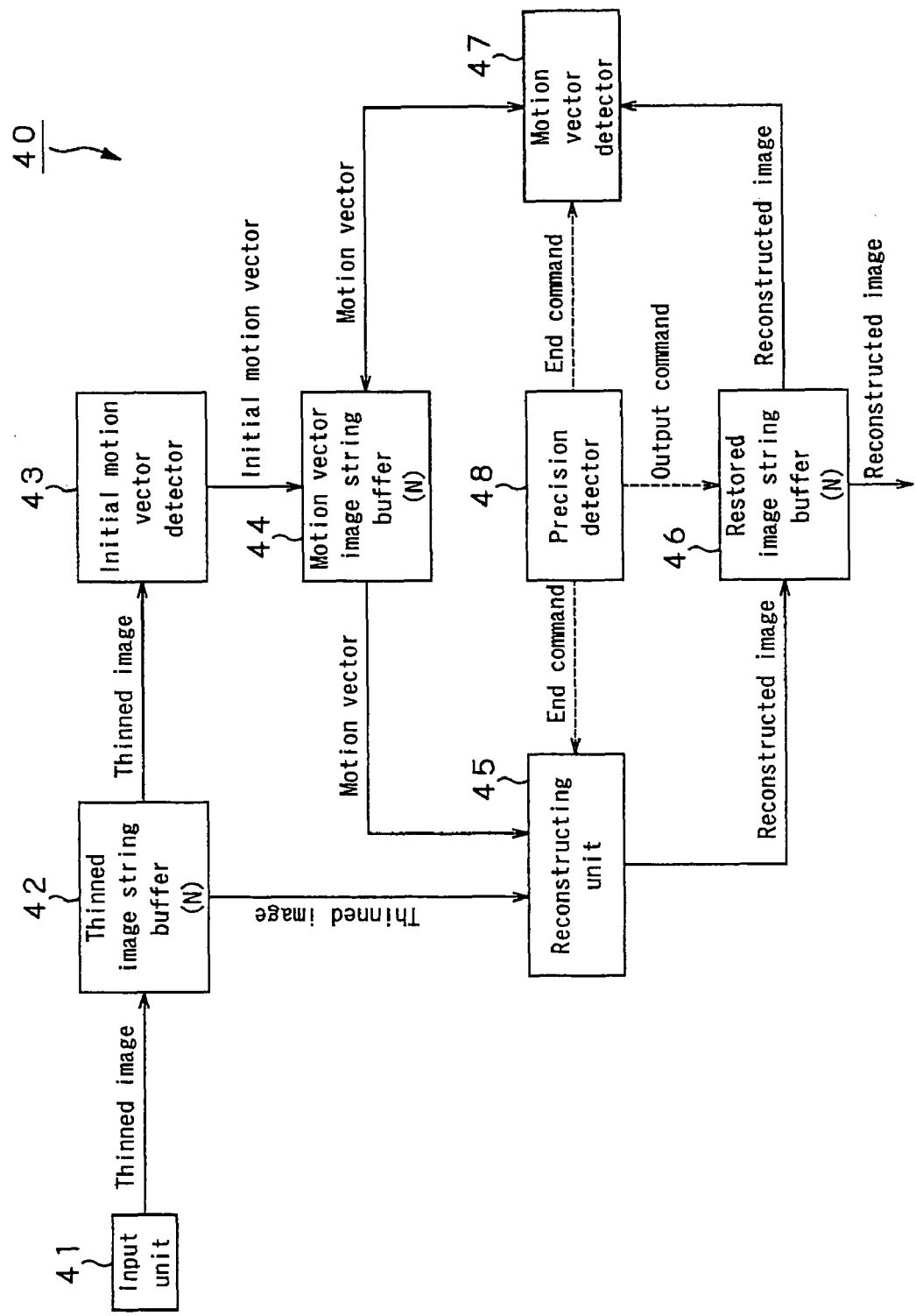
FIG. 8 is a schematic block diagram showing the basic construction of the moving picture converter according to the present invention.

Referring now to FIG. 8, there is schematically illustrated in the form of a block diagram the moving picture converter 40 according to the present invention. It should be noted that the number of images stored in a buffer is indicated in parentheses. Also, a set of motion vectors per frame is also taken as an image and will be described herein as a "motion vector image". Also, a plurality of successive images will be described herein as an "image string". Further, a plurality of successive motion vectors will be described herein as a "motion vector image string".

It is assumed here that a thinned image is a string of images thinned in various thinning patterns with {(image block of 4×4 pixels)×four frames} being taken as one block unit.

Figure 9:
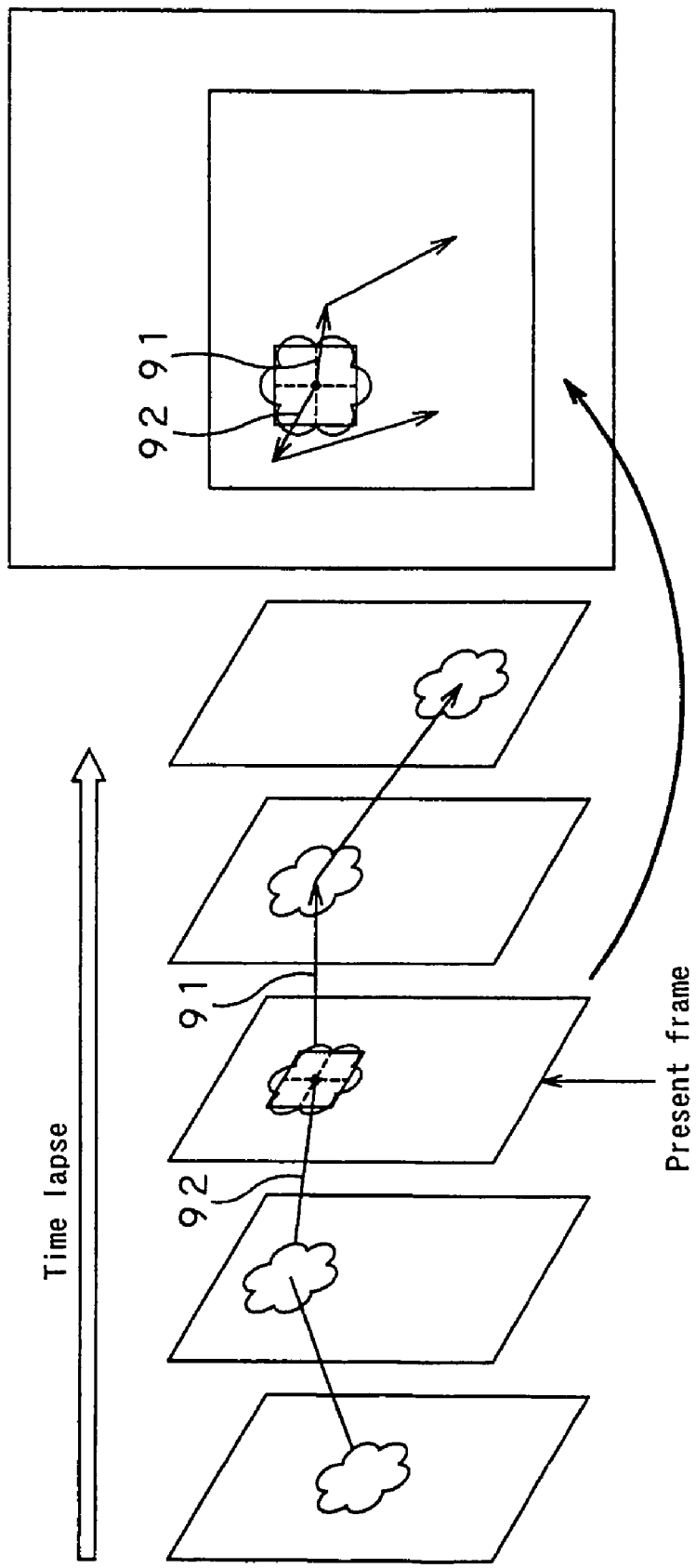
FIG. 9 explains the direction of motion vectors used in the embodiment of the present invention.

Also, a motion vector generated from a thinned image string includes a set of forward motion vectors 91 from a present frame to next frame and a set of backward motion vectors 92 from a present frame to preceding frame as shown in FIG. 9. That is, two motion vectors will be assigned to each pixel in one frame. The forward and backward motion vectors 91 and 92 are taken herein each as a two-dimensional vector to indicate in which direction (toward a next or preceding frame) and how much an image near the pixels in the present frame has been moved. Of course, the block size and number of motion vectors may be changed.

First, the basic construction of the moving picture converter 40 will be described with reference to FIG. 8.

A thinned image is supplied to an input unit 41 of the moving picture converter 40, and the supplied thinned image is stored into a thinned image string buffer 42. The thinned image string buffer 42 stores N thinned images. There is also provided an initial motion vector detector 43 that detects an initial motion vector from the thinned image stored in the thinned image string buffer 42 and stores it into a motion vector image string buffer 44.

The moving picture converter 40 also includes a reconstructing unit 45 that reconstructs a restored image on the basis of the initial motion vector stored in the motion vector image string buffer 44 and thinned image stored in the thinned image string buffer 42. There is also provided a restored image string buffer 46 to store N restored images. Further, a motion vector detector 47 detects a motion vector higher in precision than the initial motion vector on the basis of the restored image reconstructed by the reconstructing unit 45 and stores it into the motion vector image string buffer 44.

The reconstructing unit 45 reconstructs a restored image on the basis of a new motion vector stored in the motion vector image string buffer 44 and the thinned image. The motion vector detector 47 detects a higher-precision motion vector higher on the basis of the reconstructed restored image. Thereafter, the restored-image reconstruction by the reconstructing unit 45 and motion-vector detection by the motion vector detector 47 are alternately repeated.

The moving picture converter 40 also includes a precision detector 48 that will determine, each time a restored image is reconstructed, a difference between a preceding reconstructed restored image and a latest one, and will cease, when the difference between the reconstructed restored images is found sufficiently small, the alternate repetition of the restored-image reconstruction by the reconstructing unit 45 and motion-vector detection by the motion vector detector 47. The image obtained as the result is a final restored image.

As above, the moving picture converter 40 according to the present invention can restore an original moving picture from only a thinned image by repeating the thinned-image reconstruction and motion-vector detection with an initial motion vector based on the thinned image being taken as an initial value.

Next, each of the above components of the moving picture converter 40 will be described in detail.

The initial motion vector detector 43 detects an initial motion vector on the basis of a thinned image only. The initial motion vector is used as an initial value with which the reconstructing unit 45 reconstructs a restored image. In the moving picture converter 40 according to the present invention, taking the initial motion vector as an initial value permits quick completion of the alternate repetition of the operations of the reconstructing unit 45 and motion vector detector 47.

Figure 10:
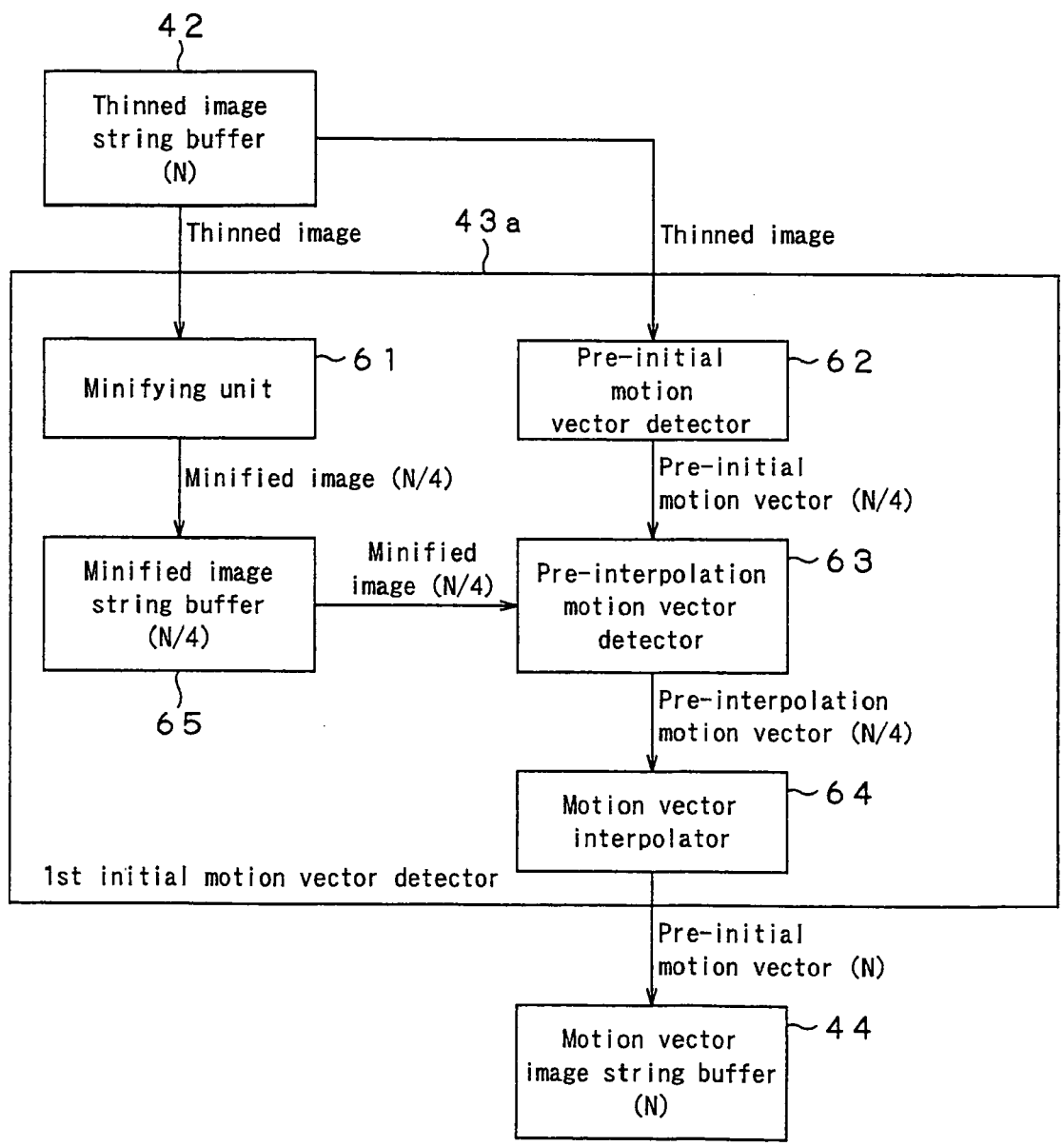
FIG. 10 is a schematic block diagram showing the basic construction of the first initial motion vector detector.
Figure 11:
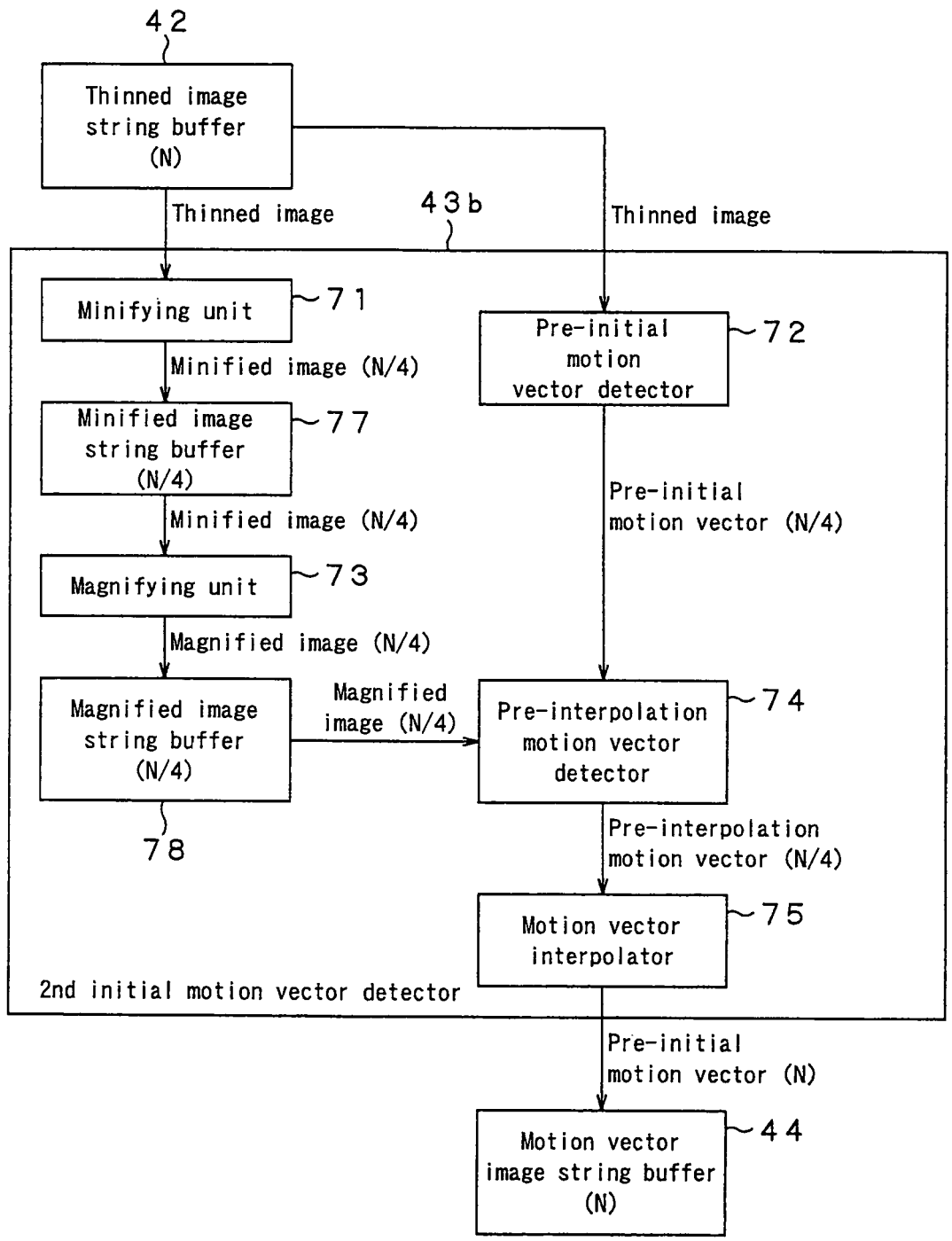
FIG. 11 is a schematic block diagram showing the basic construction of the second initial motion vector detector.
Figure 12:
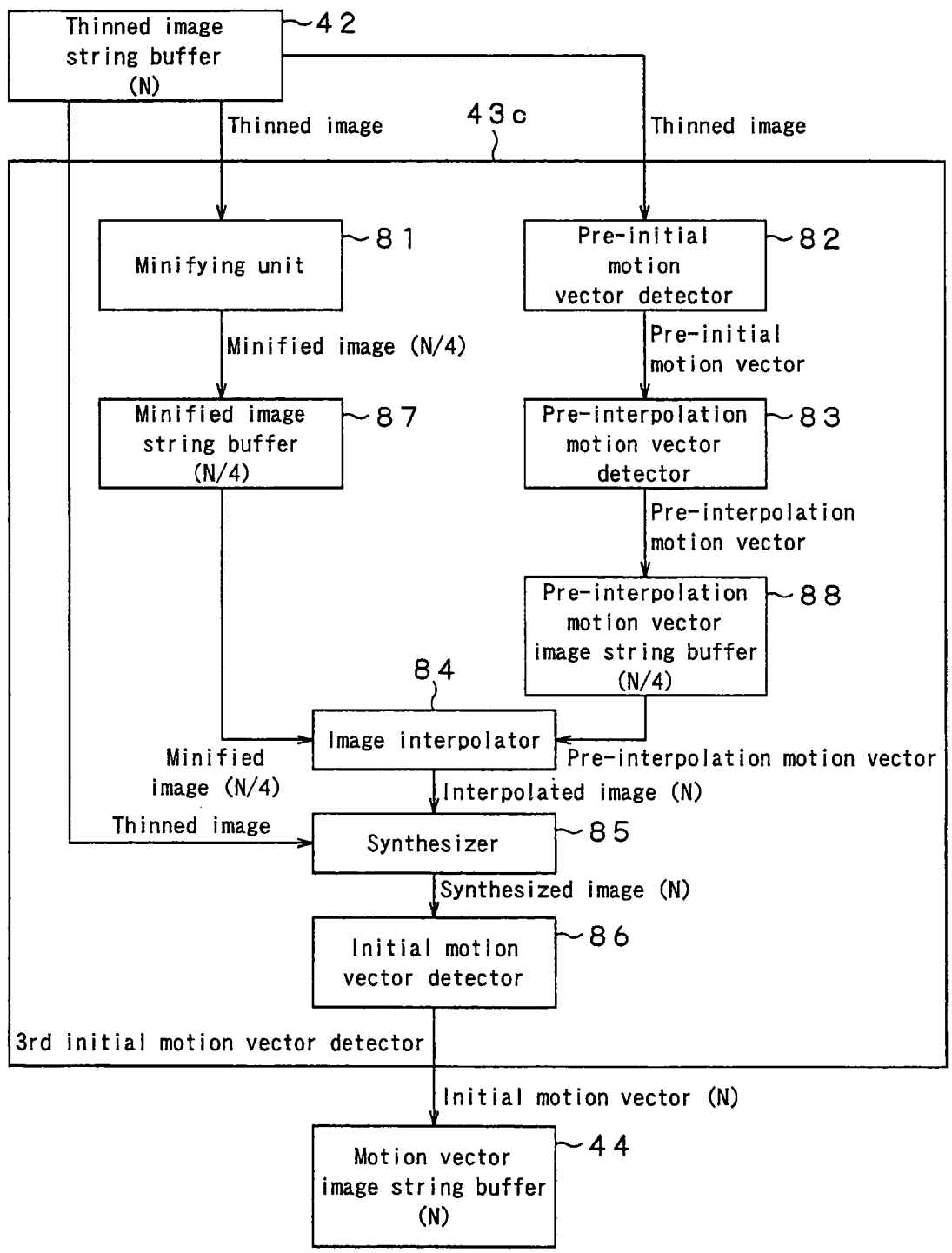

The initial motion vector detector 43 is constructed as shown in FIGS. 10 to 12. This embodiment will be explained concerning three types of the initial motion vector detector 43. It should be noted that the initial motion vector detector 43 shown in FIG. 10 will be referred to as a first initial motion vector detector 43*a*, the initial motion vector detector 43 shown in FIG. 11 will be referred to as a second initial motion vector detector 43*b* and the initial motion vector detector 43 shown in FIG. 12 will be referred to as a third initial motion vector detector 43*c*.

As shown in FIG. 10, the first initial motion vector detector 43*a* includes a minifying unit 61 to minify a thinned image, a pre-initial motion vector detector 62 to detect a pre-initial motion vector as an initial value for pre-interpolation motion vector detection, and a pre-interpolation motion vector detector 63 to detect, in the minified thinned image, an approximate pre-interpolation motion vector lower in resolution and frame rate than a restored image, and a motion vector interpolator 64 to interpolate the pre-interpolation motion vector detected by the pre-interpolation motion vector detector 63, to thereby generate an initial motion vector.

The pre-initial motion vector detector 62 detects a pre-initial motion vector as a motion vector with which the pre-interpolation motion vector detection is started. The pre-initial motion vector detector 62 extracts a block from the thinned image and estimates an approximate pre-initial motion vector of each block from the thinning pattern of the extracted block. The pre-initial motion vector detector 62 stores pre-initial motion vectors for N/4 frames into a pre-initial motion vector buffer 66.

More specifically, when generating a thinned image, the aforementioned moving picture converter 40 divides one frame into blocks each including 4×4 pixels. When the block in one block is moved horizontally more than two pixels, only one of the horizontal four pixels shown in FIG. 3 is selected as a representative value. The thinning pattern of this block is as shown in FIG. 3B.

Based on this fact, the pre-initial motion vector detector 62 detects that the block has been moved horizontally more than two pixels in one frame in the case where the thinning pattern of the block is as shown in FIG. 3B. Similarly, in the case where the thinning pattern of the block is as shown in FIG. 3C, the pre-initial motion detector 62 can also detect a vertical movement of the block.

Also, in the case where the horizontal moving distance is more than one pixel and less than two pixels, only two of the horizontal four pixels are selected as representative values as shown in FIG. 5. Based on this fact, the pre-initial motion vector detector 62 detects that the block has been moved horizontally more than one pixel and less than two pixels in one frame in the case where the thinning pattern of the block is as shown in FIG. 5B. Similarly, in the case where the thinning pattern is as shown in FIG. 5C, the pre-initial motion detector 62 will detect that the block has been moved vertically more than one pixel and less than two pixels in one frame.

Further, in the case where both the horizontal and vertical movements are less than one pixel, blocks for three frames of four blocks in corresponding positions in four successive frames are thinned. The pre-initial motion vector detector 62 detects that the block movement is less than one pixel in the case where a block not thinned and blocks of a total of three frames before and after the block not thinned have been thinned.

The pre-initial motion vector detector 62 detects a pre-initial motion vector indicative of an approximate moving distance of a block on the basis of the relation between the thinned blocks and the distance of block movement.

The minifying unit 61 selects one frame of N (integer) thinned images stored in the thinned image string buffer 42 at every four frames, and minifies the selected frame to a quarter of its initial size both horizontally and vertically. Namely, a thinned image has the resolution thereof reduced to a quarter and also the frame rate reduced to a quarter. The thinned image thus minified is stored as a minified image string into a minified image string buffer 65.

The minifying unit 61 selects a frame which will have the largest number of pixels remaining in a block thinned in a time direction. As has been mentioned previously, the pixels are laid in four patterns, namely, four pixels along one vertical line, four pixels along one horizontal line, eight pixels along two vertical lines and eight pixels along two horizontally lines. In the case of a thinning pattern in which a group of pixels always remain in position within a block when the block is moved over a distance, even if a thinned image is minified to a quarter, it is possible to estimate its original thinning pattern.

The pre-interpolation motion vector detector 63 accesses the minified image string buffer 65 and detects a pre-interpolation motion vector as a motion vector from one minified image to another by local search. The local search is started at an initial value to search a solution. The initial value used herein is a pre-initial vector. The pre-interpolation motion vector detector 63 can complete a repetitive calculation required for detection of a pre-interpolation motion vector early by starting the search at a pre-initial motion vector approximate to the solution of the pre-interpolation motion vector.

The pre-interpolation motion vector detector 63 supplies the detected motion vector to the motion vector interpolator 64. The pre-interpolation motion vector image string is an approximate motion vector detected based on a minified image lower in resolution and frame rate that a restored image. It should be noted that the motion vector detection by the pre-interpolation motion vector detector 63 is similar to the motion vector detection by the motion vector detector 47. The motion vector detection will be described in detail later.

The motion vector interpolator 64 interpolates a pre-interpolation motion vector for the same resolution and frame rate as those of a restored image. More specifically, the motion vector interpolator 64 makes a space-directional interpolation and an inter-frame time-directional interpolation. In the spade-directional interpolation, a near-four bilinear interpolation, for example, is made of a pre-interpolation motion vector. In the time-directional interpolation, it is assumed that the object is moving at a constant speed over four frames and motion vectors are generated for the intermediate three frames and start points of a motion vector connecting one frame to another and a motion vector in each frame are determined. Then, re-sampling is made of each frame so that the motion-vector start points thus determined will be pixel centers. The motion vector interpolator 64 stores the initial motion vector thus generated into the motion vector image string buffer 44.

Next, the second initial motion vector detector 43*b* will be explained. The second initial motion vector detector 43*b* up-converts a minified image to generate a magnified image whose resolution is the same as that of the restored image and detects a pre-interpolation motion vector from the magnified image, so that the spatial interpolation applied to the pre-interpolation motion vector may not be done.

As shown in FIG. 11, the second initial motion vector detector 43b includes a minifying unit 71 to minify a thinned image, a pre-initial motion vector detector 72 to detect a pre-initial motion vector as an initial value for detection of a pre-interpolation motion vector, a magnifying unit 73 to magnify the minified thinned image, a pre-interpolation motion vector detector 74 to detect, in the magnified image, a pre-interpolation motion vector having the same resolution as that of the restored image, and a motion vector interpolator 75 to generate an initial motion vector through interpolation of the pre-interpolation motion vector.

The pre-initial motion vector detector 72 extracts a block from the thinned image to estimate a pre-initial motion vector as an approximate motion vector of each block from the thinning pattern of the extracted block. The above operations are similar to those made by the pre-initial motion vector detector 62 in the first initial motion vector detector 43a. The pre-initial motion vector detector 72 in the second initial motion vector detector 43b further re-samples a pre-initial motion vector and gives the pre-initial motion vector the same resolution as that of the restored image. The pre-initial motion vector detector 72 supplies the pre-initial motion vector having the resolution thus increased to the pre-interpolation motion vector detector 74.

The minifying unit 71 operates similarly to the minifying unit 61 in the first initial motion vector detector 43a to store a minified thinned image into a minified-thinned image string buffer 77. The minified-image string buffer 77 stores N/4 minified images.

The magnifying unit 73 makes, for example, a near-four bilinear interpolation of the minified image stored in the minified-image string buffer 77 to up-convert the resolution of the minified image to that of the restored image. The magnifying unit 73 stores the magnified thinned image into a magnified-image string buffer 78. The magnified-image string buffer 78 stores N/4 magnified images.

The pre-interpolation motion vector detector 75 accesses the magnified-image string buffer 78 to detect a pre-interpolation motion vector as a motion vector of the magnified image. The pre-interpolation motion vector detected in the magnified image is a motion vector lower in frame rate than the restored image.

The motion vector interpolator 74 makes an inter-frame time-directional interpolation. It is assumed that the object is moving at a constant speed over four frames. In the time-directional interpolation motion vectors for intermediate three frames are generated and a start point of the motion vector in each frame of a motion vector connecting the frames is determined. Then, each frame is re-sampled so that the motion vector start point thus determined will be a pixel center. The motion vector interpolator 75 stores the initial motion vector thus generated into the motion vector image string buffer 44.

Since the second initial motion vector detector 43b magnifies a minified image to the same resolution as that of the restored image and detects a pre-interpolation motion vector in the magnified image as above, the spatial-directional interpolation by the motion vector interpolator 75 may not be done.

Next, the third initial motion vector detector 43c will be explained. The third initial motion vector detector 43c generates a returned image by converting a minified image to the same resolution and frame rate as those of the restored image and detects a pre-interpolation motion vector on the basis of the returned image, whereby it is possible to omit the spatial interpolation and inter-frame time-directional interpolation applied to the pre-interpolation motion vector.

As shown in FIG. 12, the third initial motion vector detector 43c includes a minifying unit 81 to minify a thinned image, a pre-initial motion vector detector 82 to detect a pre-initial motion vector as an initial value for detection of a pre-interpolation motion vector, a pre-interpolation motion vector detector 83 to detect a pre-interpolation motion vector with the pre-initial motion vector being taken as an initial value, an image interpolator 84 to generate an interpolated image by converting, based on the pre-interpolation motion vector, the minified image to the same resolution and frame rate as those of the restored image, a synthesizer 85 to combine the thinned image and interpolated image, and an initial motion vector detector 86 to detect an initial motion vector in the synthetic image from the synthesizer 85.

The pre-initial motion vector detector 82 operates similarly to the pre-initial motion vector detector 62 in the first initial motion vector detector 43a to extract a block from a thinned image and estimate a pre-initial motion vector as an approximate motion vector for each block from the thinning pattern of the extracted block.

The minifying unit 81 operates similarly to the minifying unit 61 in the first initial motion vector detector 43a to store a minified thinned image into a minified-image string buffer 87. The minified-image string buffer 87 stores N/4 minified images.

The pre-interpolation motion vector detector 83 operates similarly to the pre-interpolation motion vector detector 63 in the first initial motion vector detector 43a to access the minified-image string buffer 87 and detects a pre-interpolation motion vector as a motion vector between minified images. The initial value used here is a pre-initial motion vector. There is also provided a pre-interpolation motion vector image string buffer 88 to store motion vectors for the N/4 frames. The motion vector stored in the pre-interpolation motion vector image string buffer 88 is an approximate one based on a minified image lower in resolution and frame rate than the restored image.

The image interpolator 84 interpolates, based on the pre-interpolation motion vector, the minified image to the same resolution and frame rate as those of the restored image. To raise the resolution of the minified image, re-sampling, such as near-four bilinear interpolation is used. To raise the frame rate, a frame reproducing technique for motion compensation, such as used in the MPEG (Moving Picture Experts Group) is used. Thus, intermediate three frames are generated at every two frames before being subjected to interpolation.

The synthesizer 85 combines the interpolated image supplied from the image interpolator 84 and thinned image supplied from the thinned-image string buffer 42 together to produce a synthetic image with priority given to valid pixels of the thinned image.

The initial motion vector detector 86 detects initial motion vectors for N frames on the basis of N synthetic images. The initial motion vector detector 86 stores the detected initial motion vectors into the motion vector image string buffer 44. The operations for detection of motion vectors in the initial motion vector detector 86 are similar to those in the motion vector detector 47. The motion vector detection will be explained in detail later.

In the third initial motion vector detector 43c, since a motion vector is determined based on the interpolated image equal in frame rate and resolution to the restored image, the space-directional interpolation and time-directional interpolation of a motion vector may not be done.

The reconstructing unit 45 restores pixels that have been thinned by the space-directional thinning on the basis of a thinned image supplied from the input unit and motion vector stored in the motion vector image string buffer 44 and pixels that have been thinned by the time-directional thinning.

Figure 13:
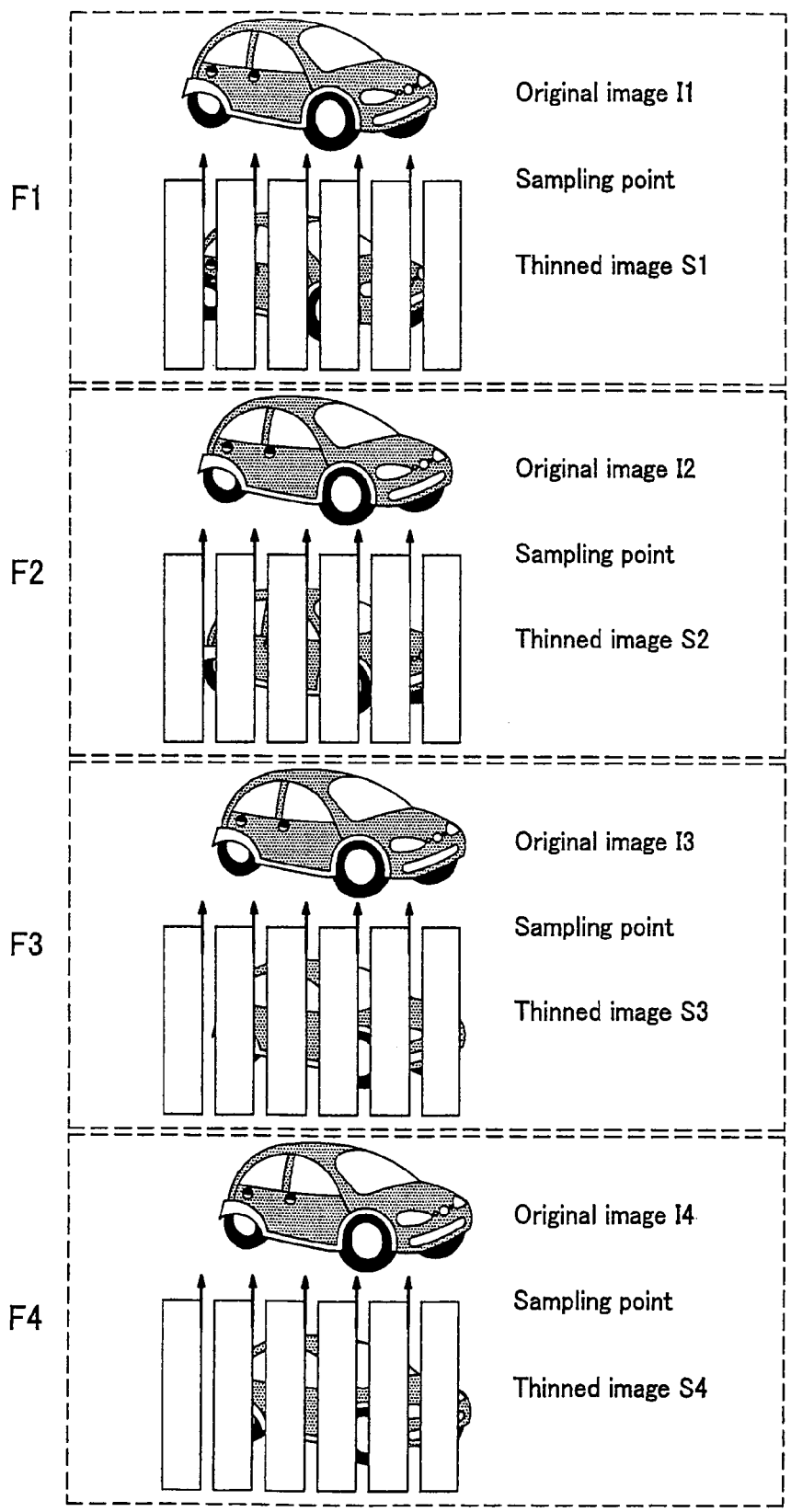
FIG. 13 is a schematic block diagram showing the basic construction of the third initial motion vector detector.

First, the theory of restoring an original image from a moving picture that lacked information due to space-directional thinning will be explained. FIG. 13 shows images S1 to S4 resulting from horizontal quarter spatial thinning of original images I1 to I4 of an object (car) moving rightward. The original image I1 in the frame F1 is a captured image of the object moving rightward.

Figure 2:
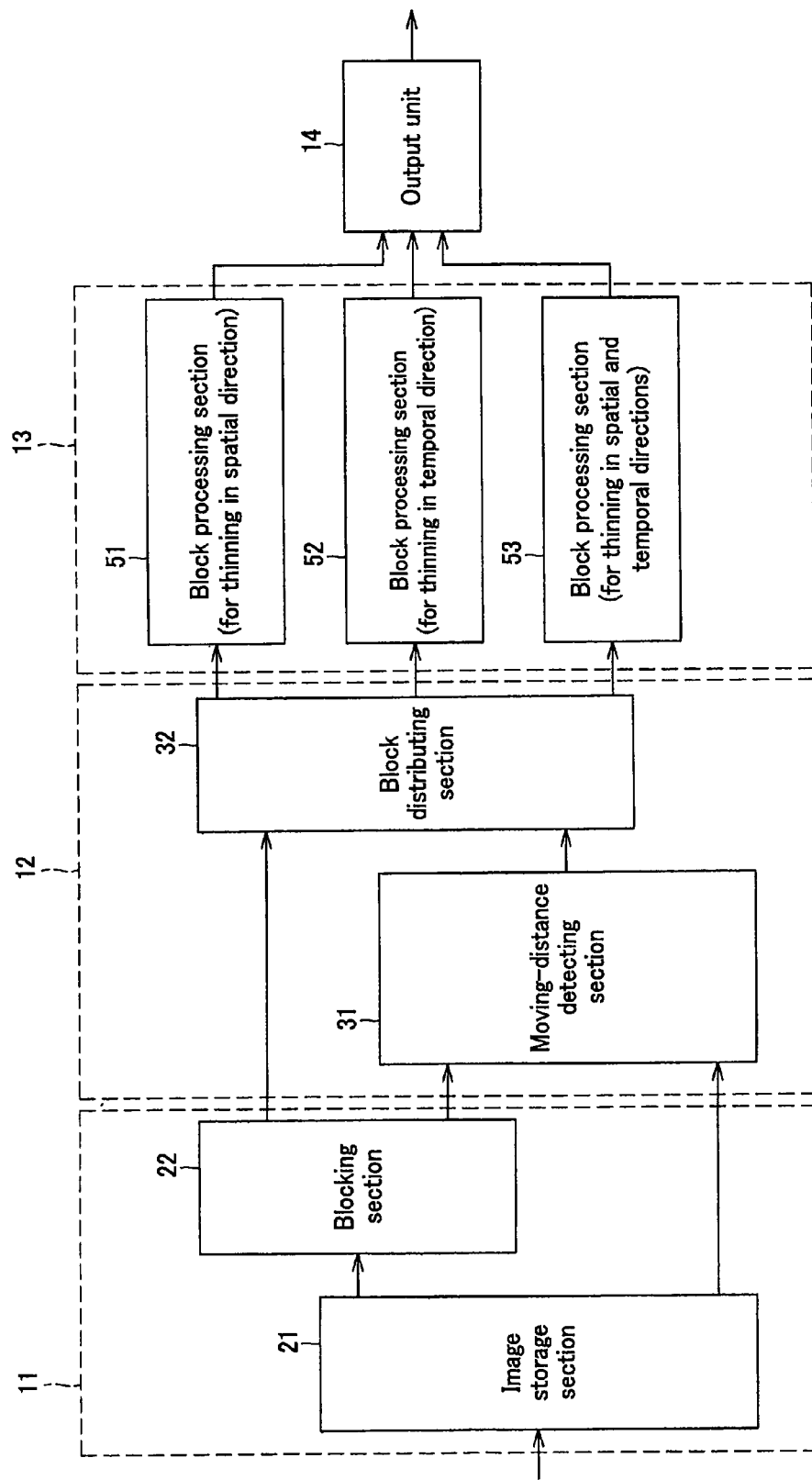
FIG. 2 is also a schematic block diagram of the basic construction of the moving picture converter in which data conversion is made under the super-resolution effect.

In the case where the moving velocity of the object (car) meets the condition that the blocking section 32 of the moving picture converter 10 in FIG. 2 distributes to the block processing section 51, that is, a predetermined moving distance per frame, the block processing section 51 will make space-directional thinning. As the result, the original image I1 is thinned horizontally to a quarter at a sampling point indicated with an arrow in FIG. 13. It should be noted that the position of the sampling point (corresponding to the representative pixel in FIG. 3) in this thinning operation is stationary in relation to the frame. The thinned image S1 has a data amount which is a quarter of the data amount of the original image I1.

In the frame F2, the original image 12 is shifted by the moving velocity v (pixel/frame) to the right of the original image I1. In this condition, the frame F2 is thinned similarly to the frame F1 to provide the thinned image S2. Since the position of the sampling point is the same as that of the frame F1 at this time, the thinned image S2 will be different from the thinned image S1.

Similarly, in the frames F3 and F4, the original images I3 and I4 are thinned to provide the thinned images S3 and S4, respectively. It is assumed herein that v=1 (pixel/frame) and the super-resolution effect takes place with the quarter thinning at the time of ordinary display.

The thinned images S1 to S4 have been thinned at the sampling points in positions corresponding to each other. Unless the moving velocity v of the object is any integral multiple of the thinning amount (4 in this embodiment), however, the thinned images S1 to S4 are those sampled in different positions. Therefore, each of the thinned images S1 to S4 lacks information of its original image and information in the thinned images S1 to S4 are different from each other. By adding together these thinned images while aligning them in relation to each other, it is possible to restore the original image.

Figure 14:
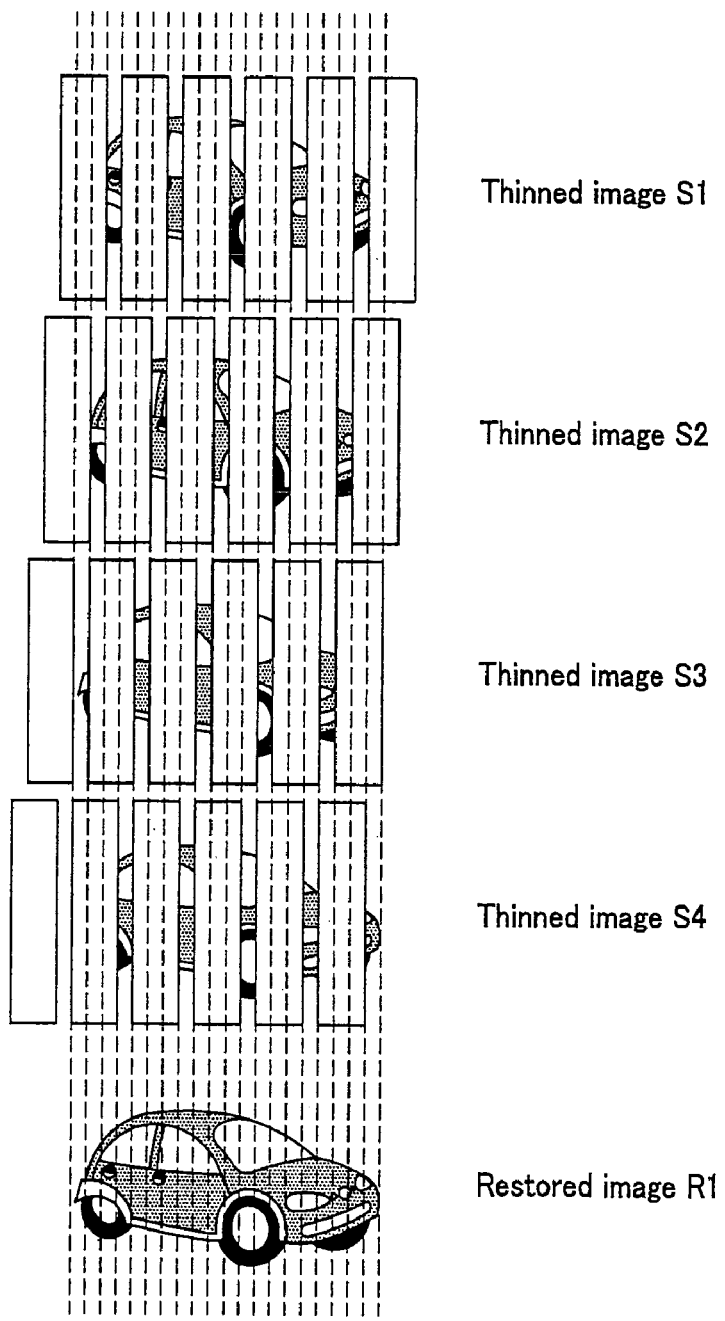
FIG. 14 explains horizontal spatial thinning of an image of a moving object and restoration of an original moving picture.

FIG. 14 shows images resulted from moving the thinned images S1 to S4 corresponding to frames according to the moving velocity v. Since v=1 (rightward) in this embodiment, the thinned image S2 of the object is displaced one pixel to the right of the thinned image S1, the thinned image S3 of the object is displaced two pixels to the right of the thinned image S1, and the thinned image S4 of the object is displaced three pixels to the right of the thinned image S1. To align these thinned images, the thinned image S2 is shifted one pixel to the left, the thinned image S3 is shifted two pixels to the left and the thinned image S4 is shifted three pixels to the left (as in FIG. 14). As the result, the positions of the object in the thinned images S1 to S4 are coincident with each other and their sampling positions are different from each other. By adding together these images, a restored image R1 can be obtained.

Next, the motion vector detection by the motion vector detector 47 will be described. The motion vector detection is a location search, and the search is started with an initial motion vector being taken as a first approximate motion vector.

Note that the pre-interpolation motion vector detector 63 in the first initial motion vector detector 43a, the pre-interpola-tion motion vector detector 74 in the second initial motion vector detector 43b, the pre-interpolation motion vector detector 83 in the third initial motion vector detector 43c and the initial motion vector detector 86 operate similarly to the motion vector detector 47.

An example of an evaluation function E for a comparison in similarities between local blocks in the local search is given by the following equation (4). In the motion vector detection, a calculation is made to search a moving velocity v which will minimize the evaluation function E. With the evaluation function E, a low reliability is given to a portion of a thinned image where there are invalid pixels while a high reliability is given to a portion of the thinned image where there are valid pixels, to stabilize the convergence calculation.

$$E(p+v) = \frac{\sum_d r(p+d)r'(p+d+v)|c(p+d) - c'(p+d+v)|}{\sum_d r(p+d)r'(p+d+v)} \quad (4)$$

where
  p: Coordinates of an arbitrary point in a present frame
  v: Motion vector from the coordinates p to next and preceding frames
  d: Displacement from the coordinates
  r(x): Reliability at coordinates x of the present frame
  r'(x): Reliability at the coordinates x of next and precedent frames
  c(x): Color at the coordinates x of the present frame
  c'(c): Color at the coordinates x of the next and precedent frames If the coordinates of the valid pixel are coincident with the coordinates x, a value "1" is assigned to the reliability r(x) and r'(x). If the coordinates of the invalid pixel are coincident with the coordinates x, a value approximate to 0 (0.1, for example) is assigned to the reliability r(x) and r'(x). A near-four bilinear-interpolated value is used for the coordinates x of a sub-pixel precision neither coincident to the valid pixel nor to the invalid pixel.

The motion vector detector 47 stores the detected motion vector into the motion vector image string buffer 44. The reconstructing unit 45 reconstructs a restored image on the basis of a new motion vector and a thinned image each time the new motion vector is detected. The motion vector detector 47 detects a motion vector on the basis of the new reconstructed restored image.

The precision detector 48 determines a precision detection index indicative of the difference between a preceding reconstructed restored image and a present reconstructed restored image. In the case where the precision detection index is smaller than a threshold, it is considered that the difference between images before and after reconstruction is sufficiently smaller and the motion vector detector 47 and reconstructing unit 45 are stopped from making calculations. The precision detection index is, for example, a mean value of changes in the brightness of pixels of images before and after reconstruction, that is, a value resulting from dividing the absolute difference between the pixels before and after reconstruction by a total number of pixels. When the precision detection index is smaller than a predetermined threshold, the precision detector 48 will terminate the alternate repetition of the motion vector detection by the motion vector detector 47 and reconstruction by the reconstructing unit 45.

Note that the precision detector 48 may be designed to count the number of times of alternate repetition of the motion vector detection by the motion vector detector 47 and reconstruction by the reconstructing unit 45 and cause the motion vector detector 47 and reconstructing unit 45 to stop making calculations when the number of times of repetition of the motion vector detection by the motion vector detector 47 and reconstruction by the reconstructing unit 45 reaches a predetermined value.

Also, a change in the motion vector may be adopted, and not the brightness change, as the precision detection index. The motion vector change is, for example, a mean value of the differences between motion vectors before and after detection, that is, a value resulting from dividing a sum of the differences between a preceding detected motion vector and a present detected motion vector by a total number of motion vectors. The precision detector 48 makes a comparison between the mean value of the differences between the motion vectors and a predetermined threshold and terminates the alternate repetition of the motion vector detection by the motion vector detector 47 and reconstruction by the reconstructing unit 45 when the mean value is smaller than the threshold.

As has been described in the foregoing, the moving picture converter 40 according to the present invention can reconstruct a restored image while estimating a motion vector from compressed image data consisting of thinned images to which no motion vector is incident without a reduction of the compression ratio of the compressed image data due to the incidence of motion vectors to the thinned images.

In the alternate repetition of the motion vector detection by the motion vector detector 47 and reconstruction by the reconstructing unit 45 in the moving picture converter 40, a restored image incurring many artifacts is produced in the initial stage of operation. However, in the motion vector detection, correspondence between blocks is determined through a comparison between blocks having a certain width, and hence the artifacts are averaged so that the precision will be gradually improved. Thus, a restored image having a sufficient precision can be obtained.

Also, with an improvement of the compression ratio, even a moving picture whose frame rate is high can be transmitted/recorded when compressed at a high ratio. After the picture having the high frame rate is transmitted or recorded when compressed at a high ratio, it can be subjected to reproduction, especially to a slow-motion reproduction or a still-image display at an arbitrary time.

It should be understood by those skilled in the art that various modifications, combinations, sub-combinations and alterations may occur depending on design requirements and other factors insofar as they are within the scope of the appended claims or the equivalents thereof.

What is claimed is:

1. A moving picture converting apparatus for restoring a string of thinned images resulted from thinning pixels of a string of original images, comprising:
    an input unit to receive the string of thinned images;
    an initial motion vector detector to detect a new string of motion vector images on the basis of the string of thinned images;
    a reconstructing unit to reconstruct, each time the new string of motion vector images is detected, a string of restored images on the basis of a previous string of restored images and a previous string of motion vector images;
    a motion vector detector to detect, each time the string of restored images is reconstructed, the new string of motion vector images based on the string of restored images and the previous string of motion vector images; and
    a process terminating unit to terminate a reconstructing process by the reconstructing unit and a motion vector detecting process by the motion vector detector and output a restored image, which has been restored, of the string of restored images obtained at the time of terminating the reconstruction process.

2. The moving picture converting apparatus according to claim 1, wherein the process terminating unit calculates a brightness difference between the string of restored images reconstructed by the reconstructing unit and the previous string of restored images reconstructed by the reconstructing unit in a process preceding the reconstructing process of the string of restored images and terminates, when the brightness difference is sufficiently small, the reconstructing process by the reconstructing unit and the motion vector detecting process by the motion vector detector.

3. The moving picture converting apparatus according to claim 1, wherein the process terminating unit calculates a vector difference between the new string of motion vector images detected by the motion vector detector and the previous string of motion vector images detected immediately before the new string of motion vector images and terminates, when the vector difference is sufficiently small, the reconstructing process by the reconstructing unit and the motion vector detecting process by the motion vector detector.

4. The moving picture converting apparatus according to claim 1, wherein the motion vector detector detects a motion vector by a local search with an initial motion vector being taken as an initial value, the local search being such that an evaluation value for comparison between similarities to local blocks is determined according to the reliability of each of the thinning pixels of the string of original images.

5. The moving picture converting apparatus according to claim 1, wherein the initial motion vector detector comprises:
    a minifying unit configured to select a frame of a part of the string of thinned images and configured to minify the frame to generate a string of minified images lower in a frame rate and resolution than the string of thinned images;
    a pre-interpolation motion vector detector to detect a string of pre-interpolation motion vector images in the string of minified images; and
    an interpolator to interpolate the frame rate and resolution of the string of pre-interpolation motion vector images so as to be the same as that of a motion vector detected based on the string of thinned images, to thereby generate the new string of motion vector images.

6. The moving picture converting apparatus according to claim 1, wherein the initial motion vector detector comprises:
    a minifying unit to select a frame of a part of the string of thinned images and minify the frame to generate a string of minified images lower in a frame rate and resolution than the string of thinned images;
    a magnifying unit to magnify each image of the string of minified images to generate a string of magnified images lower in the frame rate than, and equal in resolution to, the string of thinned images;
    a pre-interpolation motion vector detector to detect a string of pre-interpolation motion vector images in the string of magnified images; and
    an interpolator to interpolate the frame rate of the string of pre-interpolation motion vector image so as to be the same as that of a motion vector based on the string of thinned images, to thereby generate the new string of motion vector images.

7. The moving picture converting apparatus according to claim 1, wherein the initial motion vector detector comprises:

a minifying unit to select a frame of a part of the string of thinned images and minify the frame to generate a string of minified images lower in a frame rate and resolution than the string of thinned images;

a pre-interpolation motion vector detector to detect a string of pre-interpolation motion vector images in the string of minified images;

an image interpolator to interpolate the frame rate and resolution of the string of minified images so as to be the same as those of the string of thinned images on the basis of the string of pre-interpolation motion vector images, to thereby generate a string of interpolated images;

a synthesizer to combine each interpolated image including in the string of interpolated images and a thinned image of the string of thinned images which temporally corresponds to each interpolated image, to thereby generate a synthetic-image string; and wherein the initial motion vector detector is configured to detect a string of initial motion vector images in the synthetic-image string.

8. The moving picture converting apparatus according to claim 5, wherein the string of thinned images is obtained by the thinning pixels in each of the blocks resulted from dividing each image included in the string of original images in a thinning pattern corresponding to the moving distance between frames of the blocks, the initial motion vector detector includes a pre-initial motion vector detector which divides a thinned image into the blocks and generates a pre-initial motion vector on the basis of a moving distance of the block corresponding to the thinning pattern of each of the blocks, and the pre-interpolation motion vector detector detecting a pre-interpolation motion vector with the pre-initial motion vector being taken as an initial value.

9. The moving picture converting apparatus according to claim 5, wherein the pre-interpolation motion vector detector detects a motion vector by a local search with a pre-initial motion vector being taken as an initial value, the local search being such that an evaluation value for comparison between similarities to local blocks is determined according to the reliability of each of pixels of the thinned image.

10. A moving picture converting method of restoring a string of thinned images resulting from thinning pixels of a string of original images, the method comprising:

receiving the string of thinned images;

detecting a string of motion vector images on the basis of the string of thinned images;

repeating a process of reconstructing, each time a new string of motion vector images is detected, a string of restored images on the basis of a string of newly restored images and a string of previously detected motion vector images and the process of detecting, each time the string of restored images is reconstructed, the new string of motion vector images based on the string of newly restored images and the string of previously detected motion vector images; and terminating a repetition under predetermined conditions and outputting a restored image, which has been to be restored, of the string of restored images obtained at the time of terminating the process.

11. A non-transitory computer readable medium having program code stored thereon, the program code being executable by a computer to restore a string of thinned images obtained by thinning a string of original images comprising:

receiving the string of thinned images;

detecting a string of motion vector images on the basis of the string of thinned images;

repeating a process of reconstructing, each time a new string of motion vector images is detected, a string of restored images on the basis of a string of newly restored images and a string of previously detected motion vector images and the process of detecting, each time the string of restored images is reconstructed, the new string of motion vector images based on the string of newly restored images and the string of previously detected motion vector images; and terminating a repetition under predetermined conditions and outputting a restored image, which has been to be restored, of the string of restored images obtained at the time of terminating the process.

* * * * *